(12) United States Patent
Damnjanovic et al.

(10) Patent No.: US 9,370,003 B2
(45) Date of Patent: *Jun. 14, 2016

(54) PHYSICAL RANDOM ACCESS CHANNEL (PRACH) TRANSMISSION IN MULTICARRIER OPERATION

(71) Applicant: QUALCOMM Incorporated, San Diego, CA (US)

(72) Inventors: Jelena M. Damnjanovic, Del Mar, CA (US); Juan Montojo, Nuremberg (DE); Peter Gaal, San Diego, CA (US); Wanshi Chen, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/968,796

(22) Filed: Aug. 16, 2013

(65) Prior Publication Data

US 2013/0336260 A1 Dec. 19, 2013

Related U.S. Application Data

(62) Division of application No. 12/557,485, filed on Sep. 10, 2009, now Pat. No. 8,526,374.

(60) Provisional application No. 61/096,602, filed on Sep. 12, 2008, provisional application No. 61/175,398, filed on May 4, 2009.

(51) Int. Cl.
*H04W 4/00* (2009.01)
*H04W 72/04* (2009.01)
(Continued)

(52) U.S. Cl.
CPC ......... *H04W 72/0453* (2013.01); *H04L 5/0053* (2013.01); *H04L 5/0094* (2013.01); *H04W 74/0866* (2013.01); *H04L 5/0048* (2013.01)

(58) Field of Classification Search
CPC .................. H04W 72/0453; H04W 74/0866; H04L 5/0048; H04L 5/0053; H04L 5/0094
See application file for complete search history.

(56) References Cited

U.S. PATENT DOCUMENTS 6,791,952 B2 9/2004 Lin et al.
6,996,083 B1 2/2006 Balachandran et al.
(Continued)

FOREIGN PATENT DOCUMENTS

JP  2008017195 A  1/2008
WO  2007052971 A1  5/2007
(Continued)

OTHER PUBLICATIONS

International Search Report—PCT/US2009/056726—International Search Authority—European Patent Office, Mar. 26, 2010.
(Continued)

*Primary Examiner* — Kevin Mew

(57) ABSTRACT

Systems and methodologies are described that facilitate selecting an uplink carrier for random access within a wireless environment having multiple carriers. Selection of an uplink carrier for random access can be randomly selected from a set of available uplink carriers. Additionally, the uplink carrier for random access can be selected based upon which uplink carrier is paired with an anchor carrier. Further, the uplink carrier for random access can be identified based upon a bandwidth related to the user equipment (UE). Reference signals can also be employed in order to identify an uplink carrier to perform random access.

20 Claims, 14 Drawing Sheets

(51) Int. Cl.
*H04W 74/08* (2009.01)
*H04L 5/00* (2006.01)

(56) References Cited

U.S. PATENT DOCUMENTS

| | | | |
|---|---|---|---|
| 7,006,477 B1 | 2/2006 | Balachandran et al. | |
| 7,853,260 B2 | 12/2010 | Holma et al. | |
| 8,009,620 B2 | 8/2011 | Zheng et al. | |
| 8,169,953 B2 | 5/2012 | Damnjanovic et al. | |
| 8,358,614 B2 | 1/2013 | Pani et al. | |
| 8,526,374 B2* | 9/2013 | Damnjanovic et al. | 370/329 |
| 8,964,659 B2* | 2/2015 | Vujcic | 370/329 |
| 2005/0174971 A1 | 8/2005 | Lenzini et al. | |
| 2006/0274712 A1 | 12/2006 | Malladi et al. | |
| 2008/0159428 A1* | 7/2008 | Shinozaki | 375/260 |
| 2009/0219893 A1 | 9/2009 | Korpela et al. | |
| 2010/0093386 A1 | 4/2010 | Damnjanovic et al. | |
| 2010/0135225 A1* | 6/2010 | Meylan et al. | 370/329 |
| 2011/0081927 A1* | 4/2011 | Gerstenberger | H04W 52/10 455/506 |
| 2011/0098074 A1* | 4/2011 | Seo et al. | 455/509 |
| 2011/0206000 A1* | 8/2011 | Kwon | H04W 74/002 370/330 |
| 2012/0008600 A1 | 1/2012 | Marinier et al. | |
| 2012/0009963 A1* | 1/2012 | Kim et al. | 455/509 |
| 2012/0051319 A1* | 3/2012 | Kwon et al. | 370/329 |
| 2012/0076042 A1* | 3/2012 | Chun et al. | 370/252 |
| 2012/0257519 A1* | 10/2012 | Frank | H04L 5/0035 370/252 |
| 2013/0010619 A1* | 1/2013 | Fong | H04W 74/002 370/252 |
| 2013/0028204 A1* | 1/2013 | Dinan | H04W 72/0453 370/329 |
| 2015/0131630 A1* | 5/2015 | Dinan | H04W 56/0005 370/336 |

FOREIGN PATENT DOCUMENTS

| | | |
|---|---|---|
| WO | 2008054112 | 5/2008 |
| WO | 2008054114 A2 | 5/2008 |

OTHER PUBLICATIONS

Motorola: "Approaches to Assess Uplink Transmission Enhancements for LTE Advanced," 3GPP DRAFT TSG-RAN WG1 #54; R1-083226,3rd Generation Partnership Project, Jeju, South Korea, Aug. 18-22, 2008.

NTT Docomo: "Initial Access Procedure for Asymmetric Wider Bandwidth in LTE Advanced," 3GPP DRAFT TSG RAN WG1 Meeting #55; R1-084249, 3rd Generation Partnership Project, Prague, Czech Republic, Nov. 10-14, 2008.

Panasonic: "Support of UL/DL Asymmetric Carrier Aggregation," 3GPP DRAFT TSG RAN WG1 Meeting #54, R1-082999; 3rd Generation Partnership Project, Jeju, South Korea, Aug. 18-22, 2008.

Written Opinion—PCT/US2009/056726—ISA/EPO—Mar. 26, 2010.

* cited by examiner

PHYSICAL RANDOM ACCESS CHANNEL (PRACH) TRANSMISSION IN MULTICARRIER OPERATION

CROSS-REFERENCE TO RELATED APPLICATIONS

This application is a divisional of U.S. patent application Ser. No. 12/557,485 entitled "PHYSICAL RANDOM ACCESS CHANNEL (PRACH_TRANSMISSION IN MULTICARRIER OPERATION" which was filed Sep. 10, 2009," which claims the benefit of U.S. Provisional Patent application Ser. No. 61/096,602 entitled "RANDOM ACCESS IN A MULTI-CARRIER COMMUNICATION SYSTEM" which was filed Sep. 12, 2008 and U.S. Provisional Patent Application Ser. No. 61/175,398 entitled "PHYSICAL RANDOM ACCESS CHANNEL (PRACH) TRANSMISSION IN MULTICARRIER OPERATION" which was filed on May 4, 2009. The entireties of the aforementioned applications are herein incorporated by reference.

BACKGROUND

I. Field

The following description relates generally to wireless communications, and more particularly to Physical Random Access Channel (PRACH) transmission in an environment having multiple carriers.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Within a multiple carrier wireless environment, there are numerous uplink and/or downlink carriers that are within such heterogeneous networks. Access procedure involves a user equipment (UE) obtaining C-RNTI, establishing uplink (UL) synchronization, receiving physical channel configurations and/or obtaining information for RRC connected mode. Moreover, a Physical Random Access Channel (PRACH) process involves the UE to initiate a PRACH message to a base station via an uplink carrier, wherein the base station replies via a downlink carrier. However, in a multiple carrier environment, multiple downlink carriers can be associated with one uplink carrier.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates selecting an uplink carrier for random access. The method can include determining an uplink carrier to be used by an user equipment (UE) for random access from among multiple uplink carriers. Further, the method can include performing random access via the determined uplink carrier.

Another aspect relates to a wireless communications apparatus. The wireless communications apparatus can include at least one processor configured to determine an uplink carrier to be used by the UE for random access from among multiple uplink carriers, and perform random access via the determined uplink carrier. Further, the wireless communications apparatus can include memory coupled to the at least one processor.

Yet another aspect relates to a wireless communications apparatus that selects an uplink carrier for random access. The wireless communications apparatus can include means for determining an uplink carrier to be used by the UE for random access from among multiple uplink carriers. Additionally, the wireless communications apparatus can comprise means for performing random access via the determined uplink carrier.

Still another aspect relates to a computer program product comprising a computer-readable medium having stored thereon code causing at least one computer to determine an uplink carrier to be used by the UE for random access from among multiple uplink carriers, and perform random access via the determined uplink carrier.

According to other aspects, a method that facilitates performing random access for multiple carriers in a wireless environment. The method can comprise receiving a random access preamble related to a random access for the UE via an uplink carrier, wherein the uplink carrier is determined among multiple uplink carriers. Further, the method can comprise performing random access based on the determined uplink carrier.

According to other aspects, a method that facilitates performing random access for multiple carriers in a wireless environment. The method can comprise defining a set of Physical Random Access Channel (PRACH) parameters for each of at least one downlink (DL) carrier.

Another aspect relates to a wireless communications apparatus. The wireless communications apparatus can include at least one processor configured to receive a random access preamble related to a random access for the UE via an uplink carrier, wherein the uplink carrier is determined among multiple uplink carriers, and perform random access based on the determined uplink carrier. Further, the wireless communications apparatus can include memory coupled to the at least one processor.

Another aspect relates to a wireless communications apparatus. The wireless communications apparatus can include at least one processor configured to define a set of Physical Random Access Channel (PRACH) parameters for each of at least one DL carrier. Further, the wireless communications apparatus can include memory coupled to the at least one processor.

Another aspect relates to a wireless communications apparatus that performs random access for multiple carriers in a wireless environment. The wireless communications apparatus can comprise means for receiving a random access preamble related to a random access for the UE via an uplink carrier, wherein the uplink carrier is determined among multiple uplink carriers. Moreover, the wireless communications apparatus can comprise means for performing random access based on the determined uplink carrier.

Another aspect relates to a wireless communications apparatus that performs random access for multiple carriers in a wireless environment. The wireless communications apparatus can comprise means for defining a set of Physical Random Access Channel (PRACH) parameters for each of at least one DL carrier.

Still another aspect relates to a computer program product comprising a computer-readable medium having stored thereon code for causing at least one computer to receive a random access preamble related to a random access for the UE via an uplink carrier, wherein the uplink carrier is determined among multiple uplink carriers, and perform random access via the determined uplink carrier.

Still another aspect relates to a computer program product comprising a computer-readable medium having stored thereon code for causing at least one computer to define a set of Physical Random Access Channel (PRACH) parameters for each of at least one DL carrier.

According to other aspects, a method that facilitates identifying a downlink carrier. The method can comprise defining one or more time offsets that corresponds to a DL carrier to which Physical Random Access Channel (PRACH) is intended. The method can further comprise employing the one or more time offsets when communicating a message via an uplink. The method can further comprise identifying the DL carrier based upon the received time offset.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
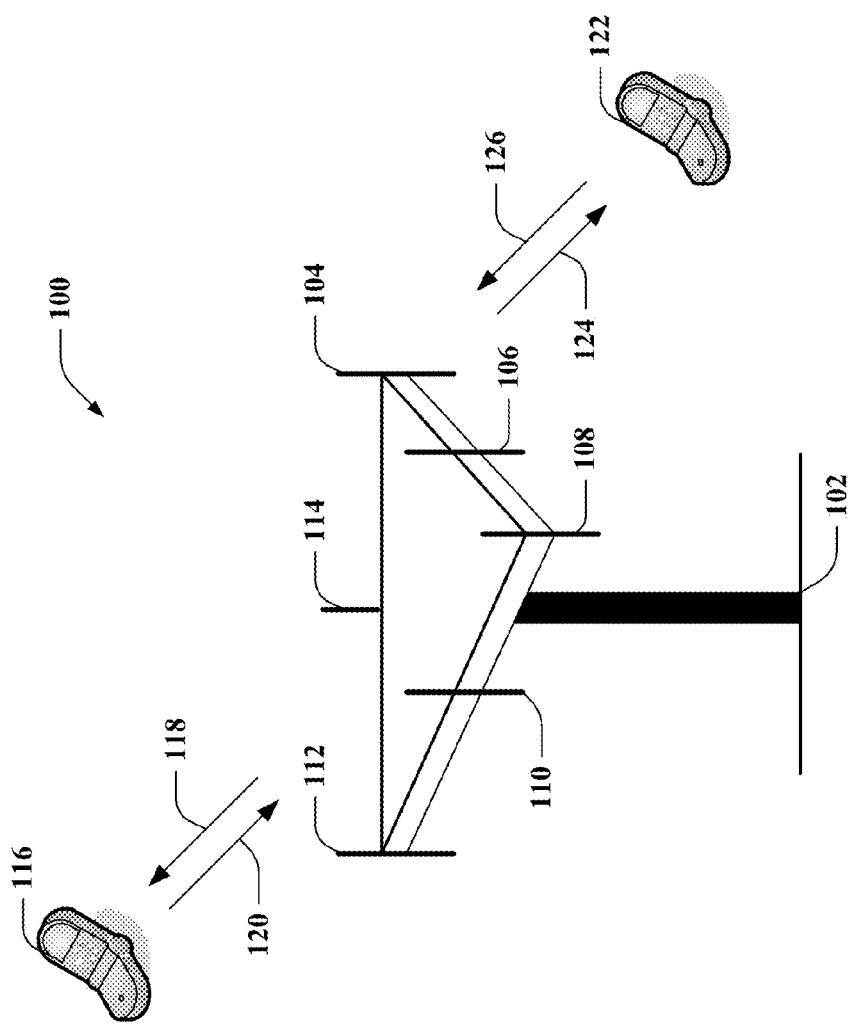
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC- FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject system and/or methods enable the UE to perform random access in a wireless environment that includes multiple carriers. In particular, an uplink carrier can be randomly selected in order to perform random access with a base station. In addition, the UE can implement random access on an uplink carrier paired with the anchor carrier defined amongst a plurality of multiple carriers. The subject innovation can further enable the UE to aggregate pilot signals (e.g., reference signals), wherein a base station or cell can redirect the user equipment based upon such pilot signals. Furthermore, a time offset can be employed to a random access preamble in order to identify a downlink carrier. In addition, a set of Physical Random Access Channel (PRACH) parameters can be defined for a particular downlink carrier in order to enable a base station to determine a downlink carrier corresponding to an uplink carrier utilized for random access.

Figure 2:
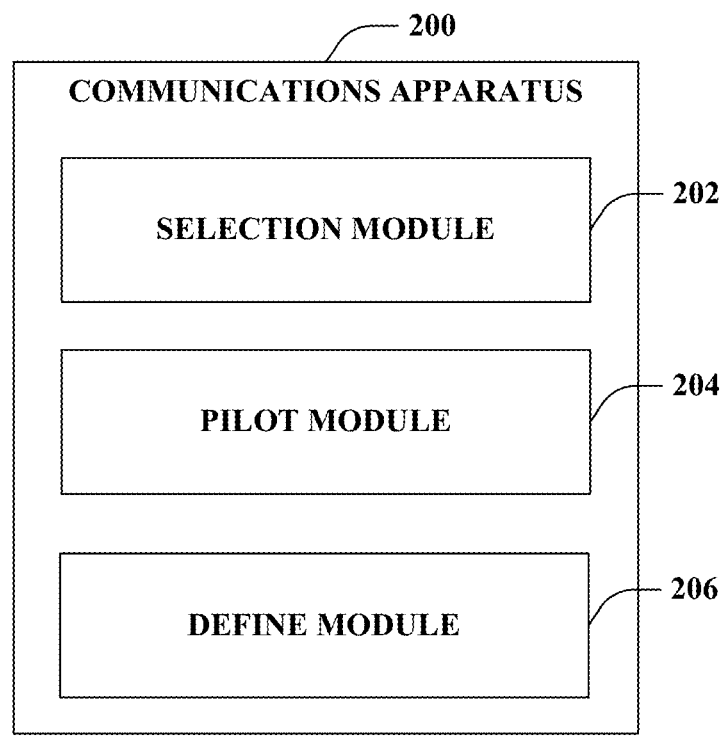
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to perform random access on an uplink carrier within a multiple carrier wireless environment.

The communications apparatus 200 can include a selection module 202 that can determine an uplink carrier on which to perform random access. The selection module 202 can identify an anchor carrier and a corresponding paired uplink carrier (e.g., uplink carrier associated with the identified anchor carrier). Moreover, the selection module 202 can randomly select an uplink carrier from the two or more uplink carriers within the multiple carrier wireless environment.

The communications apparatus 200 can further include a pilot module 204 that can measure detectable low reuse preambles (LRPs) or pilot signals (e.g., reference signals) from different cells on a particular carrier (e.g., identified anchor carrier). Based on such pilot signals or LRPs communicated, the communications apparatus 200 can be redirected to a different cell.

The communications apparatus 200 can further include a define module 206 that can define a set of Random Access Channel (RACH) parameters for each downlink carrier within the multiple carrier wireless environment. Based upon the defined set of RACH parameters, the downlink carrier can be identified. For example, an uplink carrier utilized for random access can be paired with a downlink carrier, wherein the set of RACH parameters can identify the downlink carrier.

Moreover, although not shown, it is to be appreciated that communications apparatus 200 can include memory that retains instructions with respect to determining an uplink carrier to be used by the UE for random access from among multiple uplink carriers, performing random access via the determined uplink carrier, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to receiving a random access preamble related to a random access for the UE via an uplink carrier, wherein the uplink carrier is determined among multiple uplink carriers, performing random access via the determined uplink carrier, and the like. Further, communications apparatus 200 can include a processor that may be utilized in connection with executing instructions (e.g., instructions retained within memory, instructions obtained from a disparate source, . . . ).

Figure 3:
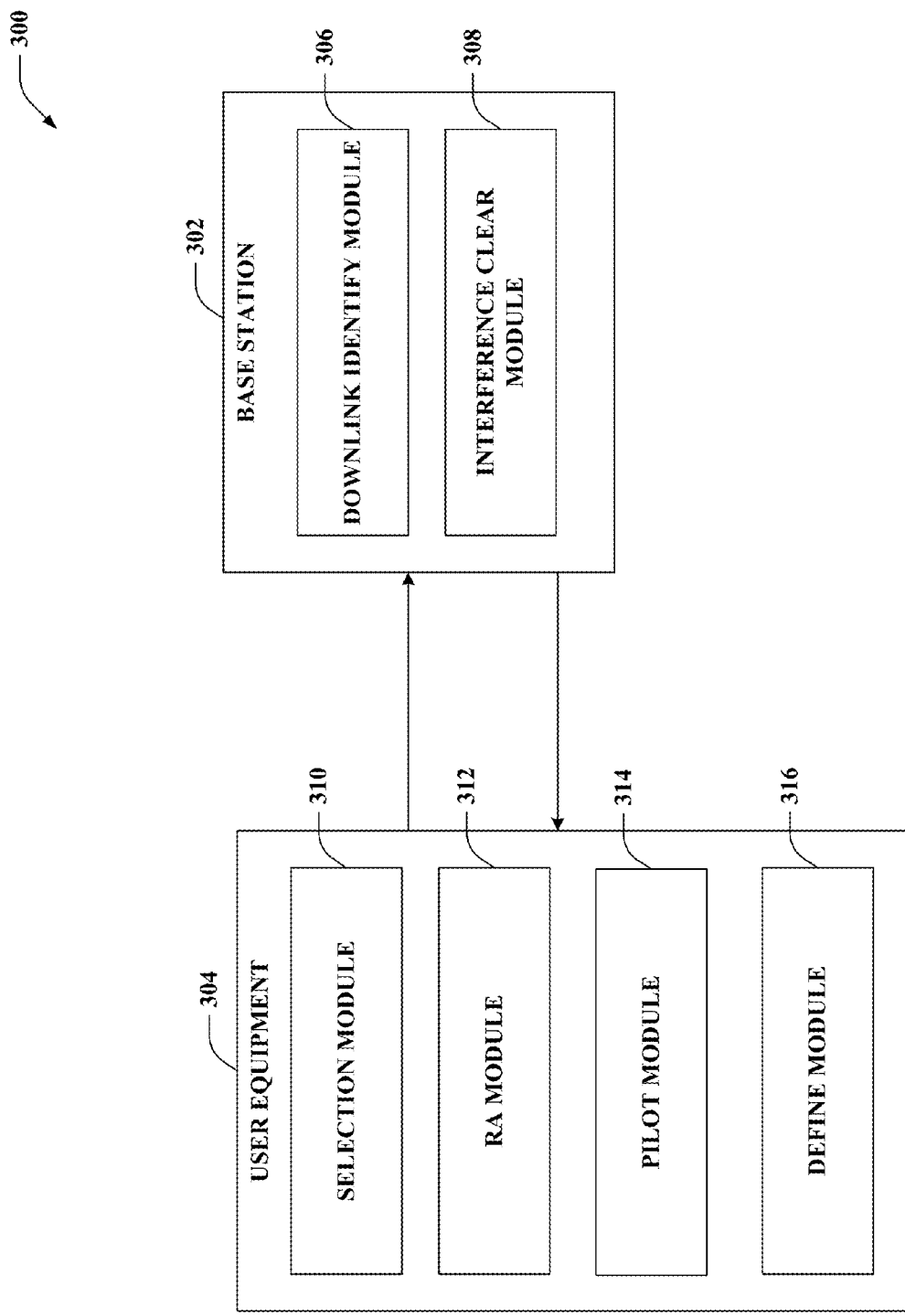
FIG. 3 is an illustration of an example wireless communications system that facilitates selecting an uplink carrier for random access from a plurality of uplink carriers.

Now referring to FIG. 3, illustrated is a wireless communications system 300 that can provide identification of control information for a user equipment related to a plurality of carriers. The system 300 includes a base station 302 that communicates with a user equipment 304 (and/or any number of disparate user equipment (not shown)). Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment 304 as well and vice versa, in one example; the configuration depicted excludes these components for ease of explanation. The base station 302 (e.g., evolved Node B, eNode B, eNB) can transmit and/or receive information, signals, data, instructions, commands, bits, symbols, and the like. It is to be appreciated that the term eNB can also be referred to as a base station, access point, Node B, or some other terminology. Base station 302 can communicate with the UE 304 via a forward link (downlink) and/or reverse link (uplink). UE 304 can transmit and/or receive information, signals, data, instructions, commands, bits, symbols, and the like. Further, although not depicted, system 300 can include any number of disparate base station(s) similar to base station 302 and/or any number of disparate UE(s) similar to UE 304. According to an illustration, system 300 can be a Long Term Evolution—Advanced (LTE-A) based system; however, the claimed subject matter is not so limited.

Base station 302 includes a downlink identify module 306 that can evaluate downlink carriers associated with a carrier in order to identify the downlink carrier paired with the uplink carrier that is utilized for random access. In particular, the downlink identify module 306 can evaluate a set of RACH parameters that can be defined to relate to a specific downlink carrier. Thus, the user equipment 304 can perform random access on a selected uplink carrier and the base station 302 can determine the corresponding downlink carrier based upon the defined RACH parameters. It is to be appreciated that a time offset can be utilized in order to identify the downlink carrier. The base station 302 can further include an interference clear module 308 that can clear interference. In other words, the interference clear module 308 can ensure that the resources utilized for access are interference cleared.

The user equipment 304 can include a selection module 310 that can select an uplink carrier to implement random access with the base station 302. The selection module 310 can identify an anchor carrier and corresponding uplink carrier in order to perform random access. In another instance, the selection module 310 can randomly select an uplink carrier from a multicarrier group supporting PRACH.

The user equipment 304 can further include a Random Access (RA) module 312 that can perform random access. For example, the random access module 312 can enable the user equipment 304 to communicate a random access preamble, receive a random access response from the base station 302, communicate a scheduled transmission with the base station 302, and receive contention resolution from the base station 302.

The user equipment 304 can further include a pilot module 314 that can aggregate and/or collect pilot signals (e.g., reference signals) and/or low reuse preambles (LRPs) from detectable cells. The pilot module 314 can communicate such measurements to the base station 302, wherein the base station can determine whether to redirect the user equipment 304 to a different cell.

The user equipment 304 can also include a define module 316 that can ensure that each downlink carrier within the multicarrier system corresponds to a specific set of RACH parameters. Thus, a detected set of RACH parameters can be detected and, in turn, identify the downlink carrier at the base station 302.

System 300 can support multicarrier operation for random access in connection with LTE-A. For instance, in system 300, multiple DL carriers can be associated with one uplink (UL) carrier. In contrast, for conventional approaches associated with LTE release 8, each PRACH (e.g., each UL carrier) can be associated with one DL carrier.

According to an example, for contention-based PRACH, UE 304 can initiate PRACH by sending a random access signal (e.g., message 1, random access preamble, random access probe, random access sequence, . . . ) over the uplink utilizing a particular UL carrier. Base station 302 can respond to receipt of message 1 with a random access response (e.g., message 2, . . . ) sent on the downlink. However, since multiple DL carriers can be associated with one UL carrier in connection with LTE-A multicarrier operation, conventional approaches can include transmitting message 2 from base station 302 using all DL carriers associated with the one UL carrier utilized for message 1 since base station 302 can be unaware of the intended UE for message 2. The foregoing example can result in inefficient utilization of downlink resources.

In contrast, system 300 can enhance efficiency associated with LTE-A multicarrier operation. The UE 304 can identify a specific time offset from a set of possible time offsets to be utilized when sending message 1 over the uplink. Moreover, the UE 304 can send the random access message (e.g., message 1, . . . ) over the uplink utilizing the specific time offset chosen.

Base station 302 can recognize the specific time offset associated with message 1 received from UE 304. Moreover, the base station 302 can identify a DL carrier (e.g., DL carrier 1, . . . ) from a set of potential DL carriers that corresponds to the specific time offset of message 1. Thereafter, the base station 302 can send message 2 over the downlink utilizing the DL carrier (e.g., DL carrier 1, . . . ) from the set of potential DL carriers identified. According to another illustration, a subset of the potential DL carriers can correspond to the offset recognized by the base station 302; further, the base station 302 can transmit message 2 using such subset of DL carriers.

Each DL carrier utilized in system 300 can be associated with a specific time offset. Typically, PRACH can be configured by higher layers with a periodicity and offset for transmission opportunities. In LTE release 8, PRACH can be configured to transmit in any subframe (e.g., periodicity=1 ms, . . . ) of a radio frame. According to another example, PRACH can be configured with a periodicity of 2 ms; thus, PRACH transmissions can occur in subframes 0, 2, 4, 6, and 8 (e.g., assuming a radio frame having a period of 10 ms, . . . ).

System 300 can employ DL carrier specific offsets, which can be known by both base station 302 and UE 304 prior to random access. For instance, each DL carrier specific offset can correspond to one given DL carrier; yet, it is to be appreciated that the claimed subject matter is not so limited. For example, the DL carrier specific offsets can be broadcasted (e.g., with system information, by base station 302, . . . ). By way of another illustration, the DL carrier specific offsets can be predefined, dynamically determined, or the like. Pursuant to a further example, the DL carrier specific offsets can be retained in memory (e.g., of base station 302 and/or UE 304, . . . ).

To differentiate different DL carriers the PRACH is intended for, the UE 304 can choose a DL carrier specific offset to be utilized when sending message 1 via the uplink. For example, PRACH can be configured with a periodicity of 1 ms. Following this example, if there are two possible DL carriers, one (e.g., DL carrier 1, . . . ) of the possible DL carriers can be defined to correspond to even subframes and the other (e.g., DL carrier 2, . . . ) of the possible DL carriers can be defined to correspond to odd subframes. It is to be appreciated, however, that the claimed subject matter is not limited to the foregoing relationship between DL carriers and offsets. For instance, it is contemplated that the division need not be orthogonal.

Thus, suppose there are five DL carriers; instead of having each of the five DL carriers associated with $\frac{1}{5}$th of the PRACH opportunities, $\frac{2}{5}$th of the PRACH opportunities can be employed for each DL carrier (e.g., an offset can correspond to more than one DL carrier, . . . ). Accordingly, with a 1 ms periodicity, each DL carrier can be associated with four offsets with a 10 ms period, which can achieve a tradeoff between DL overhead and PRACH delay.

Moreover, although not shown, it is to be appreciated that base station 302 can include memory that retains instructions with respect to determining an uplink carrier to be used by the UE for random access from among multiple uplink carriers, performing random access via the determined uplink carrier, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to receiving a random access preamble related to a random access for the UE via an uplink carrier, wherein the uplink carrier is determined among multiple uplink carriers, performing random access via the determined uplink carrier, and the like. Further, communications apparatus 200 can include a processor that may be utilized in connection with executing instructions (e.g., instructions retained within memory, instructions obtained from a disparate source, . . . ).

Figure 4:
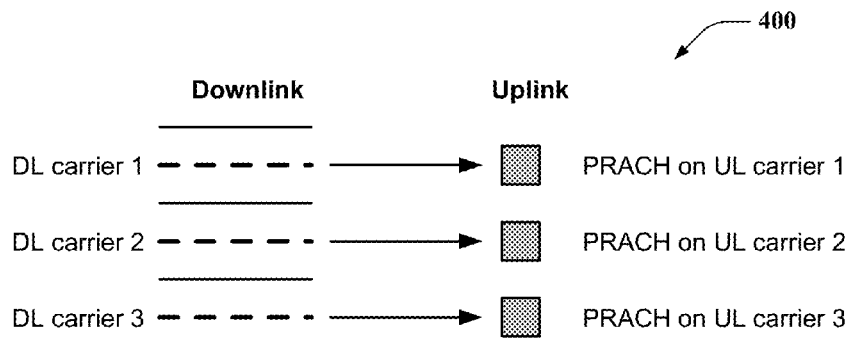
FIG. 4 is an illustration of random access design in a wireless communication system having multiple carriers.

Now referring to FIG. 4, an example wireless communications system 400 can provide assignment of an identification (ID) for each carrier. FIG. 4 illustrates a design of random access 400 that may be applicable for multi-carrier operation. In this design, each downlink carrier is paired with a corresponding uplink carrier. A cell selected by the UE for random access may have an uplink anchor carrier that is paired with a downlink anchor carrier for the cell. The uplink anchor carrier may support multiple Physical Random Access Channels (PRACHs) to accommodate a large number of UEs that may access the system. This may be especially important in multi-segment operation. The UE may perform random access on one of the PRACHs supported on the uplink anchor carrier. If the UE is camping on a particular downlink carrier, then the UE may perform random access on the paired uplink carrier. It is to be appreciated that a UE camps on the downlink carrier to which the UE is synchronized and receives a portion of system information.

Figure 5:
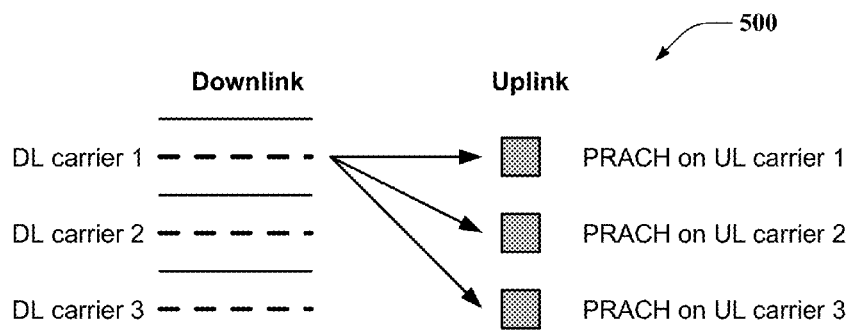
FIG. 5 is an illustration of random access design in a wireless communication system having multiple carriers

FIG. 5 illustrates another design of random access 500 that may be applicable for multi-carrier operation. In this design, a UE may randomly select an uplink carrier from a group of uplink carriers supporting PRACHs. If the UE is camping on a particular downlink carrier on a cell, the UE can still perform random access on any uplink carrier of that cell. It is to be appreciated that a UE camps on the downlink carrier to which the UE is synchronized and receives a portion of system information. The UE may perform random access on a PRACH supported on the selected uplink carrier. The UE may expect a random access response on a downlink carrier paired with the uplink carrier used for random access.

Figure 6:
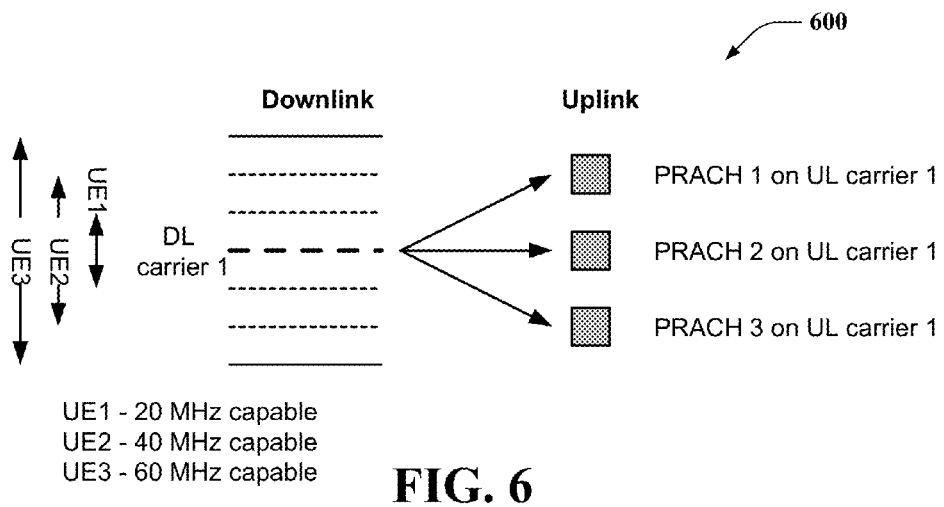
FIG. 6 is an illustration of random access design in a wireless communication system having multiple carriers

FIG. 6 shows a design of random access 600 that may be applicable for multi-segment operation. In this example, a cell is assigned downlink carrier 1 and uplink carrier 1. The cell supports three PRACHs 1, 2 and 3 on different parts of the uplink carrier. UE1 may 'see' only part of the entire bandwidth and may perform random access on only PRACH 2. UEs 2 and 3 may have larger bandwidth capabilities and may perform random access on any of the three PRACHs.

If multiple access schemes are supported (e.g., the schemes shown in FIGS. 4 and 5), then system information may include a flag that may indicate which scheme to use for random access. If multiple uplink carriers are available for a selected cell, then a UE may first attempt random access on one uplink carrier and may thereafter attempt random access on another uplink carrier for the same cell if the first attempt is unsuccessful.

Figure 7:
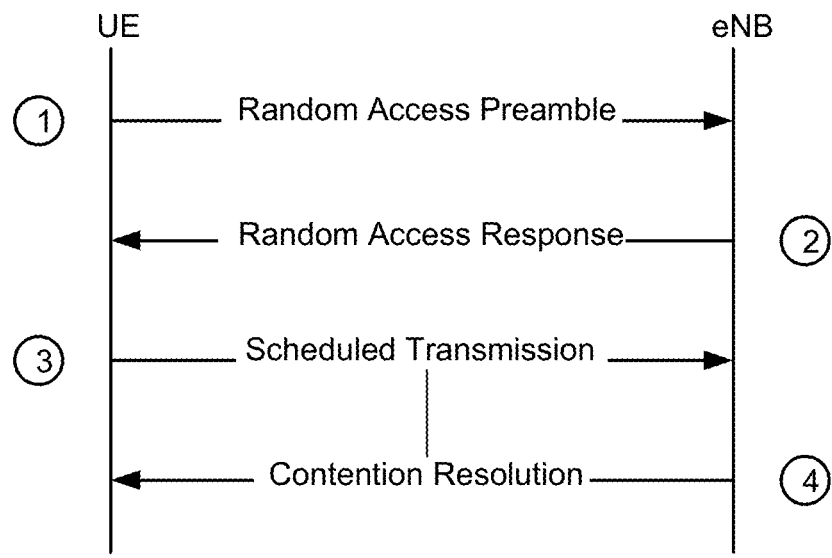
FIG. 7 is an illustration of random access performed in an environment having two or more carriers.

FIG. 7 shows a design of a random access procedure 700 that is backward compatible with 3GPP Release 8. A UE may send a random access preamble comprising a signature sequence on a PRACH (step 1). The UE may receive a random access response on a Downlink Shared Channel (DL-SCH) (step 2). The random access response may comprise timing alignment information, an initial uplink grant, an assignment of a temporary C-RNTI, etc. The UE may send a first scheduled uplink transmission on an Uplink Shared Channel (UL-SCH) (step 3). If the UE is performing initial access, then the first uplink transmission may comprise an RRC Connection Request with an establishment cause, an SAE Temporary Mobile Station Identifier (S-TMSI) or a random ID, etc. Information for contention resolution may be sent on the DL-SCH in case multiple UEs sent the same random access preamble on the same PRACH at the same time to the cell (step 4). RRC connection setup and physical layer (PHY) channel configuration may also be performed. The messages sent in steps 1 through 4 are also referred to as messages 1 through 4, respectively.

If the UE is synchronized to a selected cell that is the best cell on the downlink, then this cell may send messages 2 and 4 on carrier resources that may or may not be cleared of interference from neighbor cells. However, the cell with the best downlink may not have the best uplink for the UE due to possible discrepancy in transmit power levels of different types of cells (e.g., macro cells and pico cells). Thus, interference may be statically cleared on uplink resources for the selected cell in order to ensure reliable transmission of message 3 to this cell.

The UE may perform random access to a selected cell that does not have the best pathloss (PL) and may cause significant interference to other UEs accessing/transmitting to this cell. Therefore, it may be beneficial for cells that would experience significant interference to clear resources and not use them.

The UE may send message 3 (the first scheduled uplink transmission) on interference cleared resources since this message may interfere with uplink data in other cells (e.g., the cell that the UE has the best pathloss). However, the UE may send message 1 (the random access preamble) on a PRACH without interference clearing if cells have the same PRACH configuration. A PRACH configuration may be associated with specific resources used for sending message 1, which may be referred to as access resources. If the same PRACH configuration is used for neighbor cells, then interference clearing may not be needed for message 1 due to a large processing gain for the PRACH and a small probability of the PRACH being used. It may be beneficial for pico cells within the coverage of a macro cell to have the same PRACH configuration (e.g., PRACH is configured and transmission of a random access preamble, if triggered by a MAC layer, is restricted to certain time and frequency resources).

It may be desirable to clear access resources for the PRACHs. The cleared access resources may be occasional in time and may have lower periodicity than the regularly configured access resources. Different time offsets and/or different non-overlapping PRACH configurations among different cells may help prevent collisions of access resources and enable clearing.

Figure 8:
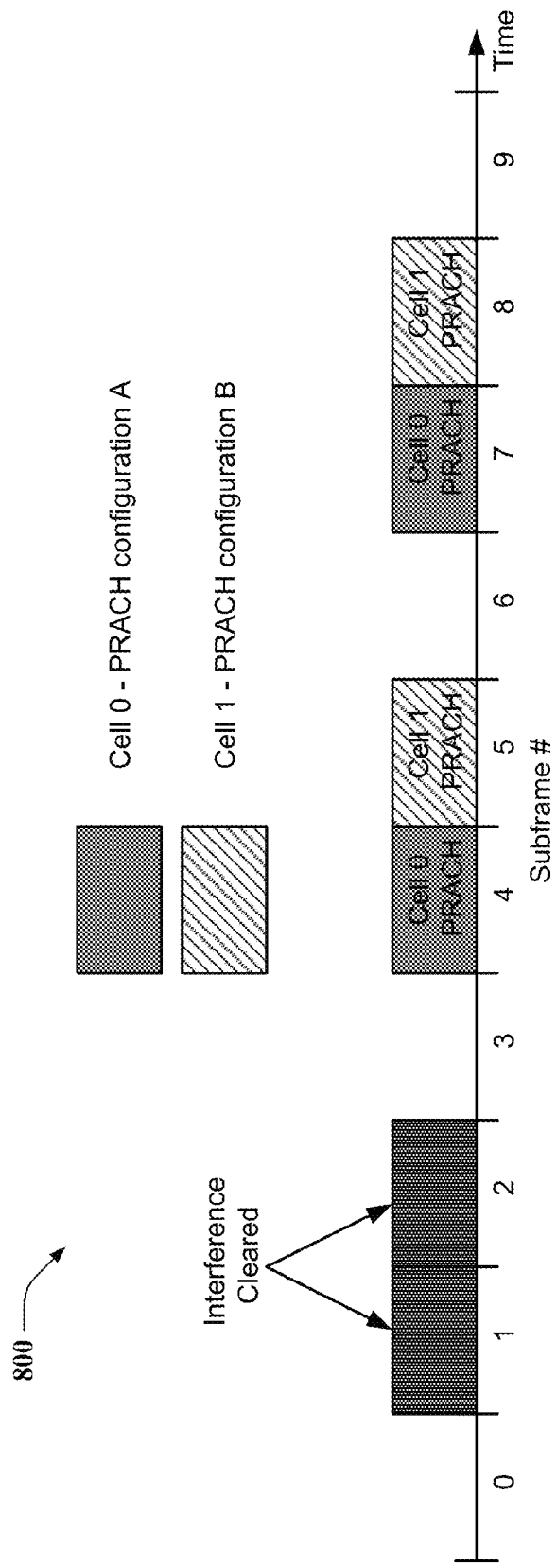
FIG. 8 is an illustration of resource clearing related to random access in accordance with the claimed subject matter.

FIG. 8 shows a design of resource clearing for random access 800. In the example shown in FIG. 8, PRACH configuration A includes access resources in subframes 4, 7, etc., which may not be cleared of interference from neighbor cells. PRACH configuration B includes access resources in subframes 5, 8, etc., which may not be cleared of interference from neighbor cells. Subframes 1 and 2 may include cleared access resources that may be cleared of interference from neighbor cells. The cleared and/or non-cleared access resources may be conveyed to UEs via system information or provided in other manners.

From the perspective of a UE, the procedure for accessing a cell that is not the best downlink cell may be the same as the procedure for access the best downlink cell. The system may ensure that resources used for access are interference cleared. If the selected cell is the cell with the best pathloss, then messages 2 and 4 may be sent on interference cleared resources. In addition, if cells with CSG also use the same uplink carrier, then the access resources for messages 1 and 3 may be sent on cleared access resources.

To enable dynamic clearing of access resources, a UE may be able to communicate with a CSG cell that the UE cannot access in order to clear access resources. The UE may be within the coverage of the CSG cell, and may even be a dominant interferer to this cell, but may not be able to access the cell due to CSG. The UE may nevertheless communicate with the CSG cell in order to clear resources to allow the UE to access another cell.

The use of a random access procedure that is backward compatible with 3GPP Release 8, e.g., as shown in FIG. 7, may be desirable for several reasons. First, no changes to the random access procedure may be needed. Second, statically cleared access resources may be small. For multi-carrier configuration, at least one carrier may be Release 8 compatible, and the random access procedure may be readily supported.

Figure 9:
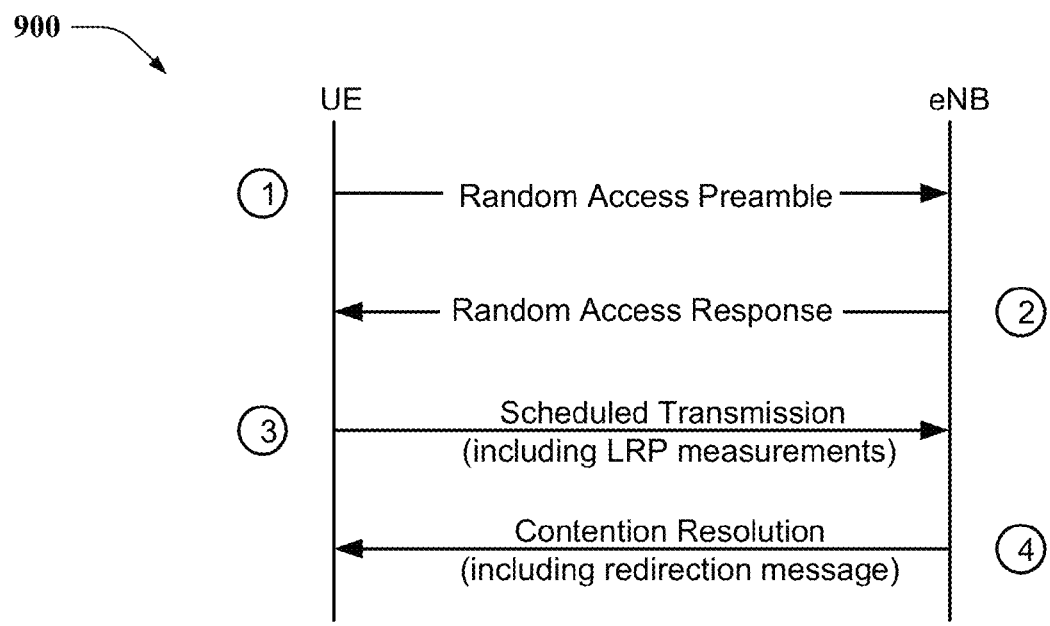
FIG. 9 is an illustration of a system that can redirect a user equipment during random access based upon a pilot or LRP signal.

FIG. 9 illustrates shows a design of a random access procedure supporting backward compatibility as well as redirection for load balancing/range extension. A UE may desire to perform initial access at power on or to a camped cell in an RRC idle mode. The UE may have synchronized to and selected the best downlink cell (or may be camping on the best downlink cell). It is to be appreciated that camping for a UE relates to the UE camping on the downlink carrier to which the UE is synchronized and receives a portion of system information. Once the UE is ready to perform random access, the UE may measure detectable low reuse preambles (LRPs) from different cells, e.g., on one carrier such as the anchor carrier for each cell. An LRP may be a reference signal or pilot sent on interference cleared resources and may be used by UEs to estimate the downlink channel and pathloss.

The UE may send a random access preamble to the selected cell (step 1) and may receive a random access response (step 2). The UE may report LRP measurements for detectable cells in message 3 (step 3).

Based on the loading of the cells and the LRP measurements, the UE may be redirected to a new cell. The selected cell may then send a redirection message to the UE (step 4). The redirection message may identify the new cell and may also include system information of this cell, which may avoid the need to statically clear interference on downlink resources used to send system information from the new cell. The content of messages 3 and 4 may be modified to support redirection for load balancing/range extension.

A UE may communicate with a serving cell in an RRC connected mode and may be redirect to access a new cell for the purpose of load balancing/range extension. The serving cell may send a reconfiguration message to the UE to direct the UE to access the new cell on a particular carrier. The decision to redirect and/or the particular carrier may be based on cell loading and the reported LRP measurements from the UE. The reconfiguration message may include system information used to access the new cell. This may allow the UE to skip reading the system information from the new cell. The new cell would not have to provide interference cleared resources to send the system information to the UE.

In another aspect, the random access procedure may be defined to be non-backward compatible with 3GPP Release 8. A UE may operate in an RRC idle mode or an RRC connected mode. The UE may perform random access in different manner depending on its operating mode.

In the RRC idle mode, the UE may have the freedom to access a cell according on a decision made by the UE (e.g., UE-based mobility). When the UE is ready to access a cell (e.g., if the UE has data to send), the UE may select a cell and a carrier based on LRP measurements and cell loading. The UE may synchronize to and obtain system information from candidate cells. For range extension cells, the resources used for synchronization and system information may be cleared of interference, e.g., with static resource clearing. The UE may monitor the LRPs of other cells. The UE may monitor an LRP on one carrier (e.g., an anchor carrier) for each cell, assuming that the carriers are sufficiently close in spectrum. Each cell may advertise its loading, e.g., resource partitioning and number of UEs. The loading information may be provided for each carrier and may be broadcast on interference cleared resources. The loading information may be sent on an anchor carrier of a cell or on each carrier independently. The UE may monitor for loading information on only the anchor carrier or on each carrier, depending on how the loading information is sent.

The UE may select a cell and a carrier for access based on a specified algorithm. In one design, the UE may make a decision based on an algorithm in which each cell and each carrier may be treated independently. In another design, all carriers of each cell may be treated jointly to obtain a metric for the cell. The UE may compare different candidate cells based on their metrics and select a cell and a carrier. For both designs, the UE may perform random access to the selected cell and carrier.

In the RRC connected mode, a decision to perform random access to another cell on a specific carrier may be made by the network (for network-based mobility) or a UE (for UE-based mobility). A random access procedure for UE-based mobility may be as follows. The UE may synchronize to and obtain system information from candidate cells. For range extension cells, the resources used for synchronization and system information may be cleared of interference, e.g., with static resource clearing. The UE may monitor and report LRP measurements for all cells that are above a certain threshold. The UE may monitor an LRP on one carrier (e.g., an anchor carrier) for each cell, assuming that the carriers are sufficiently close in spectrum. The UE may sent reports to only the current serving cell, which may share the reports other cells via a backhaul. Partitioning of resources between cells and carriers may be performed based on LRP reports from the UE as well as other UEs. The resource partitioning may be based on a specified algorithm and may be performed between a set of cells with backhaul coordination.

Each cell may send loading information, which may convey the resource partitioning, the number of UEs, etc. The loading information may be provided for each carrier and may be sent via broadcast or unicast messages on interference cleared resources. The loading information may be sent on an anchor carrier of a cell or on each carrier independently. The UE may monitor for loading information on only the anchor carrier or on each carrier, depending on how the loading information is sent. The UE may select a cell and a carrier for access based on a specified algorithm. The UE may then perform random access to the selected cell and carrier.

A random access procedure for network-based mobility may be as follows. A UE may periodically monitor and report LRP measurements for different cells. The UE may report LRP measurements for one carrier (e.g., the anchor carrier) for each cell, assuming that the carriers are sufficiently close in spectrum. The UE may sent reports only to the serving cell, which may share the reports with other cells over the backhaul. Resource partitioning between cells and carriers may be performed based on the LRP reports from the UE as well as other UEs. A cell and a carrier may be selected for the UE based on a specified algorithm and with coordination between a set of cells over the backhaul. The serving cell may send a reconfiguration message containing the selected cell and carrier to the UE. The UE may then perform random access to the selected cell and carrier.

Figure 10:
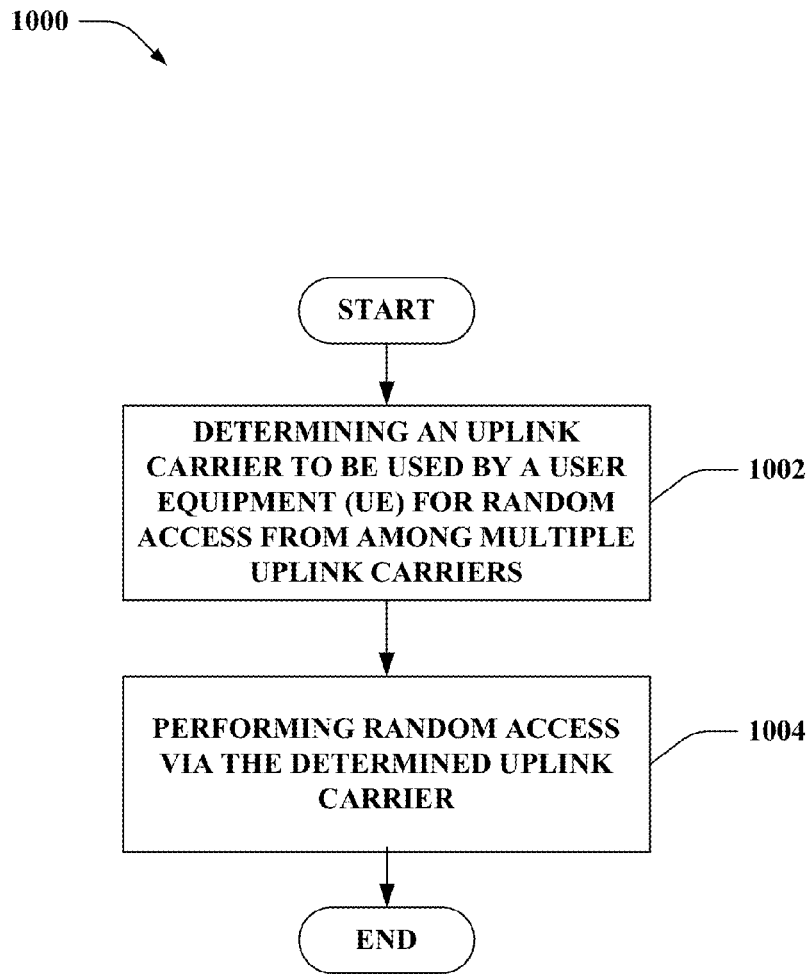
FIG. 10 is an illustration of an example methodology that facilitates selecting an uplink carrier for random access.
Figure 11:
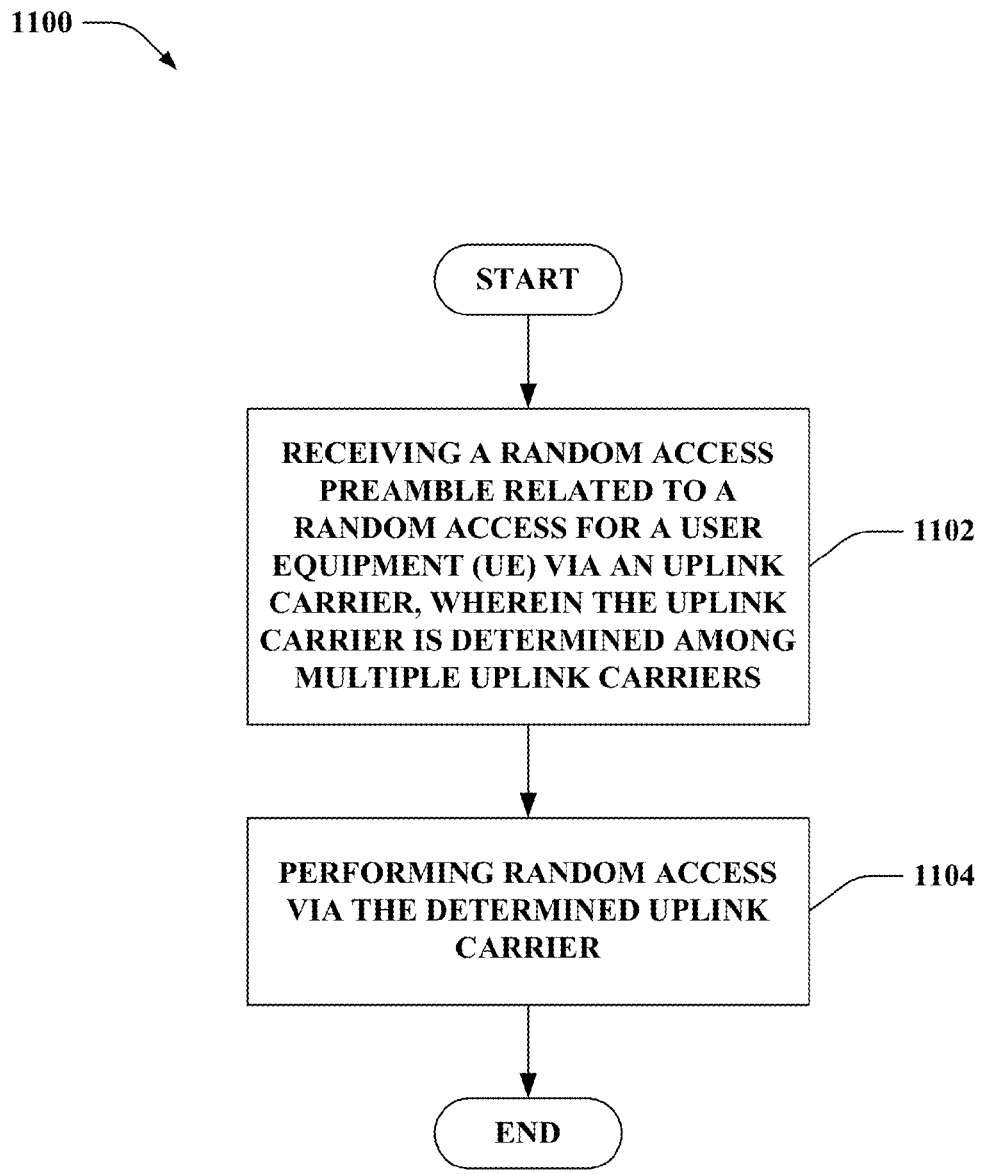
FIG. 11 is an illustration of an example methodology that facilitates performing random access for multiple carriers in a wireless environment.

Referring to FIGS. 10-11, methodologies relating to employing random access within a multiple carrier environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with one or more embodiments.

Turning to FIG. 10, illustrated is a methodology 1000 that facilitates identifying control information related to cross-carrier operation. At reference numeral 1002, an uplink carrier to be used by the UE for random access from among multiple uplink carriers can be determined. At reference numeral 1004, random access via the determined uplink carrier can be performed.

Now referring to FIG. 11, a methodology 1100 that facilitates communicating control information for two or more carriers to the UE for cross-carrier operation. At reference numeral 1102, a random access preamble related to a random access for the UE can be received via an uplink carrier, wherein the uplink carrier is determined among multiple uplink carriers. At reference numeral 1104, random access can be performed via the determined uplink carrier.

Figure 12:
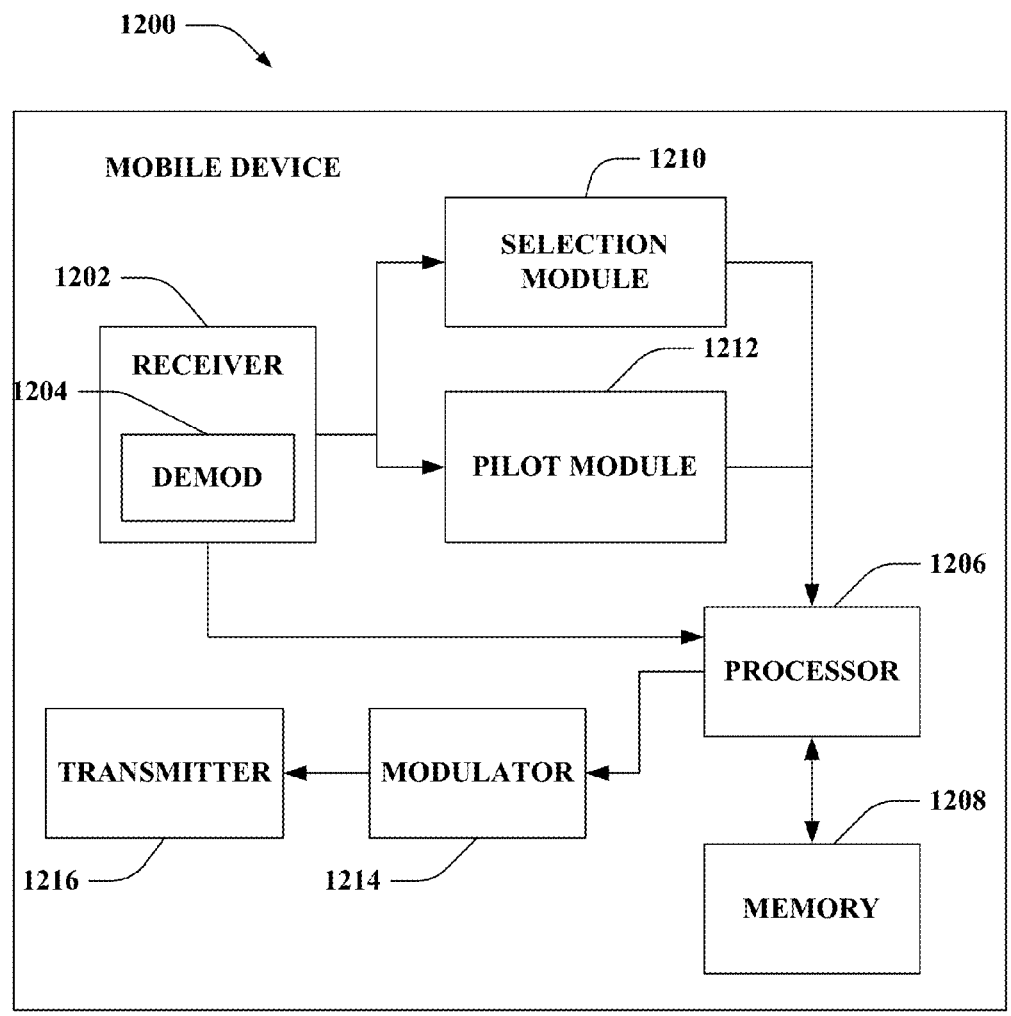
FIG. 12 is an illustration of an example mobile device that facilitates assigning identification (ID) for each carrier in a wireless communication system.

FIG. 12 is an illustration of a mobile device 1200 that facilitates assigning identification (ID) for each carrier in a wireless communication system. Mobile device 1200 comprises a receiver 1202 that receives a signal from, for instance, a receive antenna (not shown), performs typical actions on (e.g., filters, amplifies, downconverts, etc.) the received signal, and digitizes the conditioned signal to obtain samples. Receiver 1202 can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1216, a processor that controls one or more components of mobile device 1200, and/or a processor that both analyzes information received by receiver 1202, generates information for transmission by transmitter 1216, and controls one or more components of mobile device 1200.

Mobile device 1200 can additionally comprise memory 1208 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.).

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1208 of the subject systems and methods is intended to comprise, without being limited to, these and any other suitable types of memory.

Processor 1206 can further be operatively coupled to a selection module 1210 and/or a pilot module 1212. The selection module 1210 can determine an uplink carrier in which the mobile device 1200 performs random access. The selection module 1210 can randomly select an uplink carrier and/or identify an anchor carrier and corresponding (e.g., paired) uplink carrier. The pilot module 1212 can collect pilot signals and/or LRPs from detectable cells in order to enhance redirection from a base station. Moreover, although not shown, the mobile device 1200 can define a set of RACH parameters for each downlink carrier in order to enable a base station to identify a downlink carrier related to the uplink carrier utilized for random access.

Mobile device 1200 still further comprises a modulator 1214 and transmitter 1216 that respectively modulate and transmit signals to, for instance, a base station, another mobile device, etc. Although depicted as being separate from the processor 606, it is to be appreciated that the selection module 1210, pilot module 1212, demodulator 1204, and/or modulator 1214 can be part of the processor 1206 or multiple processors (not shown).

Figure 13:
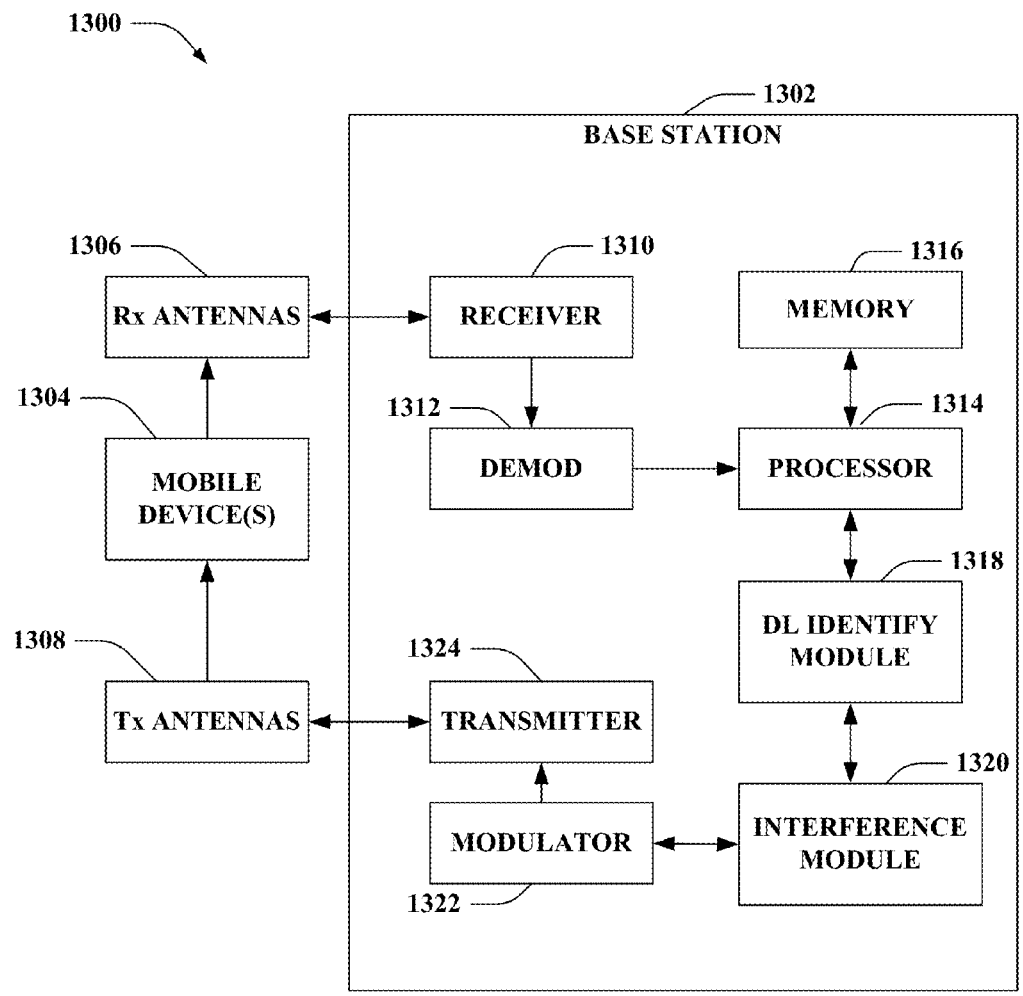
FIG. 13 is an illustration of an example system that facilitates conveying control information for each carrier based on assigned identifications (IDs) in a wireless communication environment.

FIG. 13 is an illustration of a system 1300 that facilitates conveying control information for each carrier based on assigned identifications (IDs) in a wireless communication environment as described supra. The system 1300 comprises a base station 1302 (e.g., access point, . . . ) with a receiver 1310 that receives signal(s) from one or more mobile devices 1304 through a plurality of receive antennas 1306, and a transmitter 1324 that transmits to the one or more mobile devices 1304 through a transmit antenna 1308. Receiver 1310 can receive information from receive antennas 1306 and is operatively associated with a demodulator 1312 that demodulates received information. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein.

Processor 1314 is further coupled to a DL identify module 1318 and/or an interference module 1320. The DL identify module 1318 can evaluate a time offset and/or a set of RACH parameters in order to determine a downlink carrier that corresponds to the uplink carrier utilized for random access. The interference module 1320 can clear interference on resources utilized for access. Moreover, the interference module 1320 can evaluate received pilot signals and/or LRPs from detected cells and determine whether or not the UE is to be redirected to a different cell. Furthermore, although depicted as being separate from the processor 1314, it is to be appreciated that the DL identify module 1318, interference module 1320, demodulator 1312, and/or modulator 1322 can be part of the processor 1314 or multiple processors (not shown).

Figure 14:
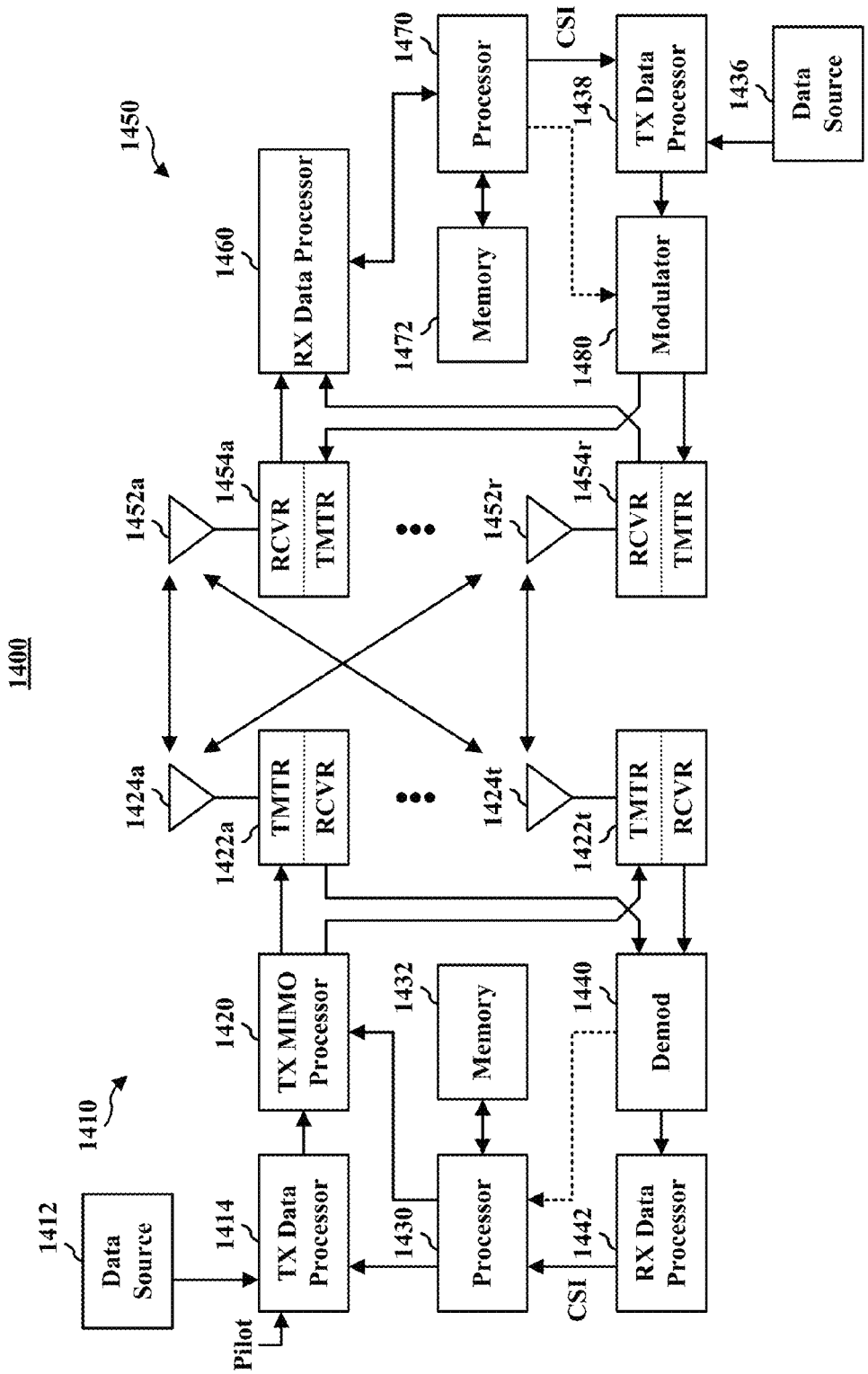
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-9 and 12-13) and/or methods (FIGS. 10-11) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which precoding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
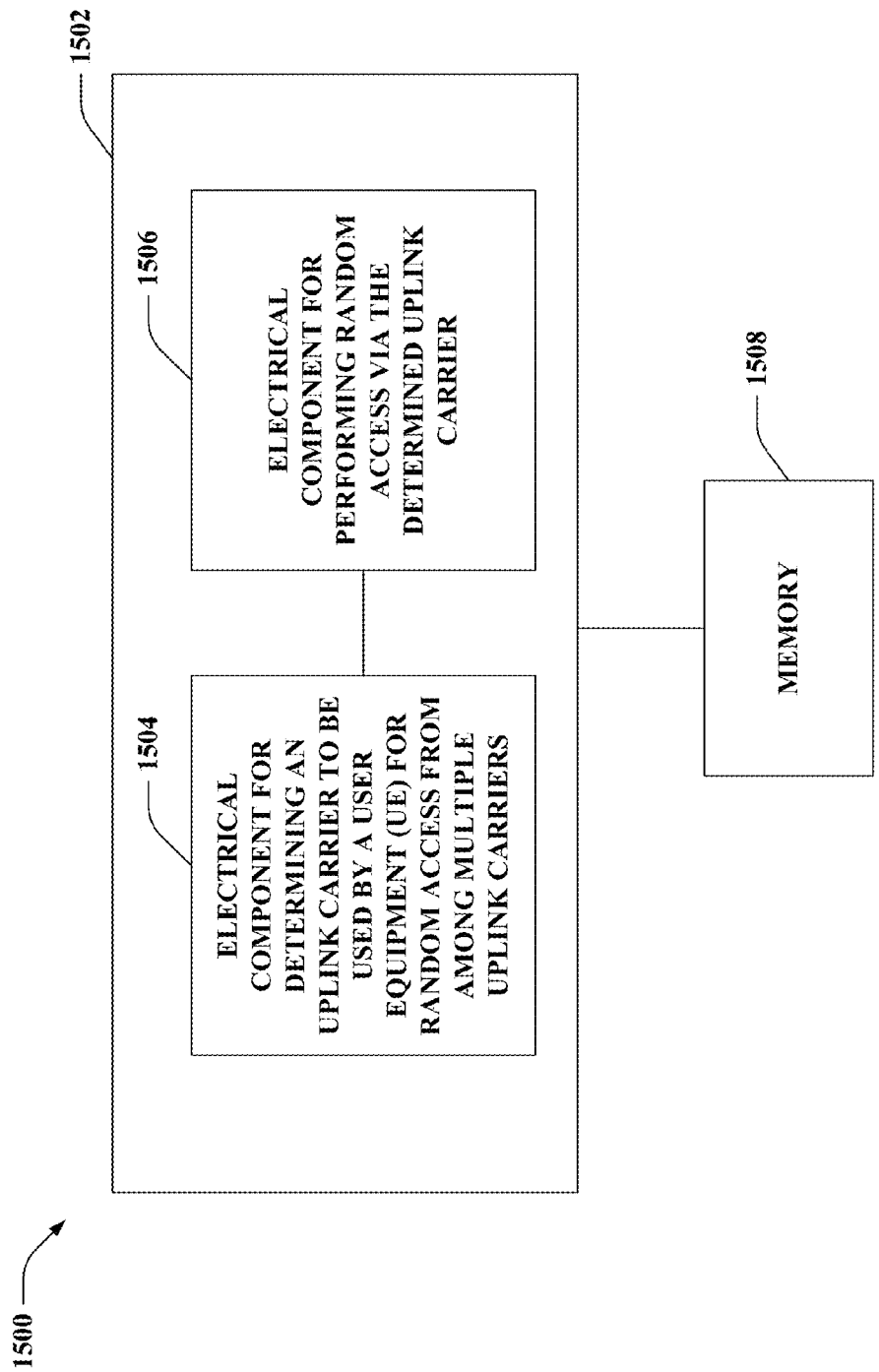
FIG. 15 is an illustration of an example system that facilitates identifying an uplink carrier to be employed for random access.

With reference to FIG. 15, illustrated is a system 1500 that identifies an uplink carrier in order to perform random access. For example, system 1000 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. The logical grouping 1502 can include an electrical component for determining an uplink carrier to be used by the UE for random access from among multiple uplink carriers 1504. In addition, the logical grouping 1502 can comprise an electrical component for performing random access via the determined uplink carrier 1506. Additionally, system 1500 can include a memory 1508 that retains instructions for executing functions associated with electrical components 1504 and 1506. While shown as being external to memory 1508, it is to be understood that one or more of electrical components 1504 and 1506 can exist within memory 1508.

Figure 16:
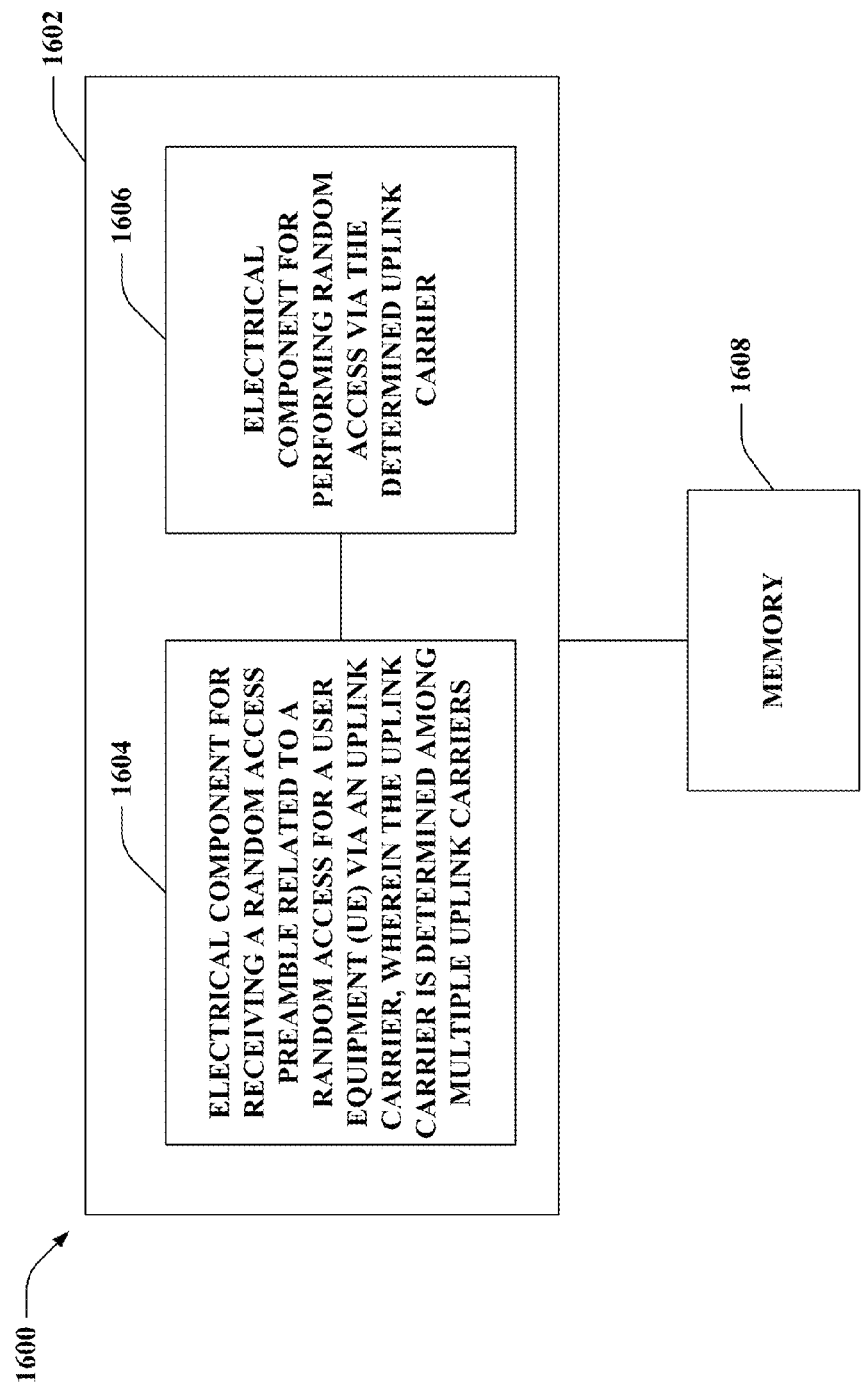
FIG. 16 is an illustration of an example system that performs random access for multiple carriers in a wireless environment.

Turning to FIG. 16, illustrated is a system 1600 that performs random access in a multiple carrier wireless environment. System 1600 can reside within a base station, mobile device, etc., for instance. As depicted, system 1600 includes functional blocks that can represent functions implemented by a processor, software, or combination thereof (e.g., firmware). System 1600 includes a logical grouping 1602 of electrical components that facilitate performing random access with a user equipment in a multiple carrier wireless environment. The logical grouping 1602 can include an electrical component for receiving a random access preamble related to a random access for the UE via an uplink carrier, wherein the uplink carrier is determined among multiple uplink carriers 1604. In addition, the logical grouping 1602 can comprise an electrical component for performing random access via the determined uplink carrier 1606. Additionally, system 1600 can include a memory 1608 that retains instructions for executing functions associated with electrical components 1604 and 1606. While shown as being external to memory 1608, it is to be understood that one or more of electrical components 1604 and 1606 can exist within memory 1608.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communication at a base station, comprising:
    defining a plurality of sets of Physical Random Access Channel (PRACH) parameters for a plurality of downlink carriers configured for communication at the base station; and
    identifying, from the plurality of downlink carriers, a downlink carrier acquired by a UE based upon a set of PRACH parameters used by the UE to perform random access, the set of PRACH parameters used by the UE being one of the defined plurality of sets of PRACH parameters.

2. The method of claim 1, wherein the set of PRACH parameters used by the UE includes at least a specific radio frame, a subframe within the radio frame, and a physical resource block in a frequency domain.

3. The method of claim of claim 1, further comprising:
    transmitting a random access response on the identified downlink carrier.

4. The method of claim 1, further comprising:
    determining a downlink carrier from among the plurality of downlink carriers;
    selecting an uplink carrier corresponding to the determined downlink carrier as the uplink carrier to be used for random access; and
    notifying a UE about the uplink carrier selection to perform the random access.

5. The method of claim 4, wherein determining the downlink carrier further comprises selecting a cell and a downlink carrier for random access based on at least one of reference signal measurements, channel quality feedback, and loading information for detectable cells.

6. A wireless communications apparatus, comprising:
    at least one processor configured to:
    define a plurality of sets of Physical Random Access Channel (PRACH) parameters for a plurality of downlink carriers configured for communication at a base station; and
    identify, from the plurality of downlink carriers, a downlink carrier acquired by a UE based upon a set of PRACH parameters used by the UE to perform random access, the set of PRACH parameters used by the UE being one of the defined plurality of sets of PRACH parameters.

7. The wireless communications apparatus of claim 6, wherein the set of PRACH parameters used by the UE includes at least a specific radio frame, a subframe within the radio frame, and a physical resource block in a frequency domain.

8. The wireless communications apparatus of claim 6, further comprising:
    at least one processor configured to:
    transmit a random access response on the identified downlink carrier.

9. The wireless communications apparatus of claim 6, further comprising:
    at least one processor configured to:
    determine a downlink carrier from among the plurality of downlink carriers;
    select an uplink carrier corresponding to the determined downlink carrier as the uplink carrier to be used for random access; and
    notify a UE about the uplink carrier selection to perform the random access.

10. The wireless communications apparatus of claim 9, wherein determining the downlink carrier further comprises selecting a cell and a downlink carrier for random access based on at least one of reference signal measurements, channel quality feedback, and loading information for detectable cells.

11. A wireless communications apparatus, comprising:
    means for defining a plurality of sets of Physical Random Access Channel (PRACH) parameters for a plurality of downlink carriers configured for communication at a base station; and
    means for identifying, from the plurality of downlink carriers, a downlink carrier acquired by a UE based upon a set of PRACH parameters used by the UE to perform random access, the set of PRACH parameters used by the UE being one of the defined plurality of sets of PRACH parameters.

12. The wireless communications apparatus of claim 11, wherein the set of PRACH parameters used by the UE includes at least a specific radio frame, a subframe within the radio frame, and a physical resource block in a frequency domain.

13. The wireless communications apparatus of claim 11, further comprising:
    means for transmitting a random access response on the identified downlink carrier.

14. The wireless communications apparatus of claim 11, further comprising:
- means for determining a downlink carrier from among the plurality of downlink carriers;
- means for selecting an uplink carrier corresponding to the determined downlink carrier as the uplink carrier to be used for random access; and
- means for notify a UE about the uplink carrier selection to perform the random access.

15. The wireless communications apparatus of claim 14, wherein the means for determining the downlink carrier further comprises means for selecting a cell and a downlink carrier for random access based on at least one of reference signal measurements, channel quality feedback, and loading information for detectable cells.

16. A computer program product comprising a non-transitory computer-readable medium comprising:
- code for causing at least one computer to define a plurality of sets of Physical Random Access Channel (PRACH) parameters for a plurality of downlink carriers configured for communication at a base station; and
- code for causing at least one computer to identify, from the plurality of downlink carriers, a downlink carrier acquired by a UE based upon a set of PRACH parameters used by the UE to perform random access, the set of PRACH parameters used by the UE being one of the defined plurality of PRACH parameters.

17. The computer program product of claim 16, wherein the set of PRACH parameters used by the UE includes at least a specific radio frame, a subframe within the radio frame, and a physical resource block in a frequency domain.

18. The computer program product of claim 16, further comprising:
- code for causing at least one computer to transmit a random access response on the identified downlink carrier.

19. The computer program product of claim 16, further comprising:
- code for causing at least one computer to determine a downlink carrier from among the plurality of downlink carriers;
- code for causing at least one computer to select an uplink carrier corresponding to the determined downlink carrier as the uplink carrier to be used for random access; and
- code for causing at least one computer to notify a UE about the uplink carrier selection to perform random access.

20. The computer program product of claim 19, wherein the code for causing at least one computer to determine the downlink carrier further comprises code for causing at least one computer to select a cell and a downlink carrier for random access based on at least one of reference signal measurements, channel quality feedback, and loading information for detectable cells.

* * * * *